United States Patent
Satyanarayana et al.

(10) Patent No.: US 6,327,245 B1
(45) Date of Patent: *Dec. 4, 2001

(54) AUTOMATIC CHANNEL SWITCHING FOR JAMMING AVOIDANCE IN BURST-MODE PACKET DATA WIRELESS COMMUNICATION NETWORKS

(75) Inventors: Shrinagesh Satyanarayana, Ossining; George Melnik, Montrose; Frank Guida, Fishkill, all of NY (US)

(73) Assignee: Philips Electronics North America Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/770,032

(22) Filed: Dec. 19, 1996

Related U.S. Application Data

(63) Continuation-in-part of application No. 08/498,286, filed on Jun. 30, 1995, now Pat. No. 5,898,733, and a continuation-in-part of application No. 08/498,715, filed on Jun. 30, 1995, now Pat. No. 5,726,644.

(51) Int. Cl.⁷ .............................. G01R 31/08; H04K 3/00
(52) U.S. Cl. ................................ 370/229; 455/1; 370/236
(58) Field of Search .................................... 370/229, 230, 370/231, 232, 235, 236, 252, 253, 310, 328, 329, 332, 344; 455/78, 83, 1, 63; 375/202

(56) References Cited

U.S. PATENT DOCUMENTS

| | | |
|---|---|---|
| 4,334,322 * | 6/1982 | Clark, III ................................ 455/62 |
| 5,101,406 | 3/1992 | Messenger . |
| 5,394,433 | 2/1995 | Bantz et al. . |
| 5,404,574 | 4/1995 | Benveniste . |
| 5,428,824 * | 6/1995 | Kasai ...................................... 455/78 |
| 5,481,571 * | 1/1996 | Balachandran et al. ............. 375/347 |
| 5,726,644 * | 3/1998 | Jednacz et al. ................. 340/825.52 |
| 5,764,700 * | 6/1998 | Makinen .............................. 375/272 |
| 5,778,322 * | 7/1998 | Rydbeck .............................. 455/558 |
| 5,839,075 * | 11/1998 | Haartsen et al. ..................... 455/450 |
| 5,854,899 * | 12/1998 | Callon et al. .................... 395/200.68 |
| 5,896,375 * | 4/1999 | Dent et al. ........................... 370/347 |

FOREIGN PATENT DOCUMENTS

0338274A1   10/1989   (EP) .

OTHER PUBLICATIONS

A.A. Bertossi et al, "Code Assignment for Hidden Terminal Interference Avoidance in Multihop Packet Radio Networks", IEEE/ACM Transactions on Networking, vol. 3, No. 4, Aug. 1995, pp. 441–449.

* cited by examiner

Primary Examiner—Douglas Olms
Assistant Examiner—Brian Nguyen
(74) Attorney, Agent, or Firm—Jack D. Slobod

(57) ABSTRACT

In a multinode, wireless packet-hopping network, all nodes operate on a same frequency, by waiting for each other. If the frequency is subject to excessive out-of-network jamming, the building computer transmits a "time-bomb", i.e. an instruction for all nodes to change to a different frequency at a fixed time.

12 Claims, 8 Drawing Sheets

AUTOMATIC CHANNEL SWITCHING FOR JAMMING AVOIDANCE IN BURST-MODE PACKET DATA WIRELESS COMMUNICATION NETWORKS

RELATED APPLICATION

This application is a continuation-in-part of U.S. application Ser. No. 08/498,286 filed Jun. 30, 1995, which matured into U.S. Pat. No. 5,898,733, herein incorporated by reference, and of U.S. application Ser. No. 08/498,715 also filed Jun. 30, 1995, which matured into U.S. Pat. No. 5,726,644.

BACKGROUND OF THE INVENTION

A. Field of the Invention

The invention relates to the field of wireless networks in which a large number of nodes communicate with a central computer. The invention relates more particularly to avoiding jamming in such a system.

B. Related Art

The aforementioned related applications describe The application relates to packet hopping networks in which messages are communicated wirelessly from a central computer to a network of nodes. The central computer has a weak transmitter and does not have the ability to communicate with all of the nodes. Accordingly, various nodes act as re-transmitters for retransmitting information to the others. Such networks are particularly useful for lighting control in a building.

In U.S. application Ser. No. 08/498,286, jamming was avoided by having a transmitting node slide its transmitting frequency with a relatively slow slide frequency. A receiving node would then slide its receiving frequency relatively quickly, to scan for transmitters. The receiving node would then temporarily freeze its receiving frequency upon crossing the frequency used by the transmitter. The receiver could then receive the message intended for it. Since transmission takes place at different frequencies, chances of being stuck at a frequency which is jammed was unlikely.

SUMMARY OF THE INVENTION

The object of the invention is to find an improved way to do jamming avoidance in large wireless networks.

This object is achieved through recognition that for many applications, especially lighting, the central computer only has to communicate with the nodes relatively rarely, for instance a few times a day. Accordingly, the central computer and all of the nodes can use a single channel. The channel need only be switched, albeit for all the nodes at once, in response to excessive use of the channel frequency by transmitters outside the current network.

A further aspect of the invention is a mechanism for getting all of the nodes to switch together to the new channel. In this aspect, commands are sent out substantially in advance of switching, i.e. via "time bomb". The term "time bomb" will be defined below.

The invention has the advantage of substantially reducing the complexity and cost of the nodes.

BRIEF DESCRIPTION OF THE DRAWING

The invention will now be described by way of non-limitative example with reference to the following drawings.

DETAILED DESCRIPTION OF THE PREFERRED EMBODIMENTS

Jamming avoidance has historically taken various forms. The most common types fall within the category called spread spectrum. This concept is to spread the frequency spectrum of a transmitted signal in order to avoid a jammed frequency. Three main categories of jamming avoidance are CDMA, frequency hopping and channel hopping, see e.g. A. Bertossi et al., "Code Assignment for Hidden Terminal Interference Avoidance in Multihop Packet Radio Networks", IEEE Trans. on Networking, Vol. 3, NO. 4, 8/95 pp. 441 et seq. All of these jamming avoidance techniques focus on getting pairs of nodes in a network communicating on different channels, be it code channels, frequency channels, or time channels.

The invention uses a single channel of communication. In order to understand why a single channel can be used, it is useful to look at an example of a typical communication. For instance, in a lighting system at the beginning of the day, the central computer can say, in effect, "This is expected to be a sunny day, therefore the lights should be dim in rooms with east windows in the morning, dim in rooms with west windows in the afternoon, medium brightness in all windowed rooms the rest of the time, and normal brightness in non-windowed rooms." Since the central computer only has to transmit this message once that day, the central computer and the repeater nodes can usually use a single channel to effect the communication. Since the information to be communicated is small, it can be encoded in packets and transmitted as bursts by interspersing the bursts from different transmitters in a time-staggered fashion.

To avoid competition for the channels, the retransmitting nodes implement delays prior to retransmission, to allow opportunities for all nodes to communicate. If any node seeking to communicate finds the channel in use, that node can afford to wait politely for its turn, without interrupting the communication of the others.

Nodes can also wait if they find the single channel in use by transmitters outside the current network. If, however, some nodes discover that statistically there is use of the single channel for too much of the time, then the whole network must change channels. The transmitter from outside the current network can be identified by the nodes using identification codes.

Figure 1:
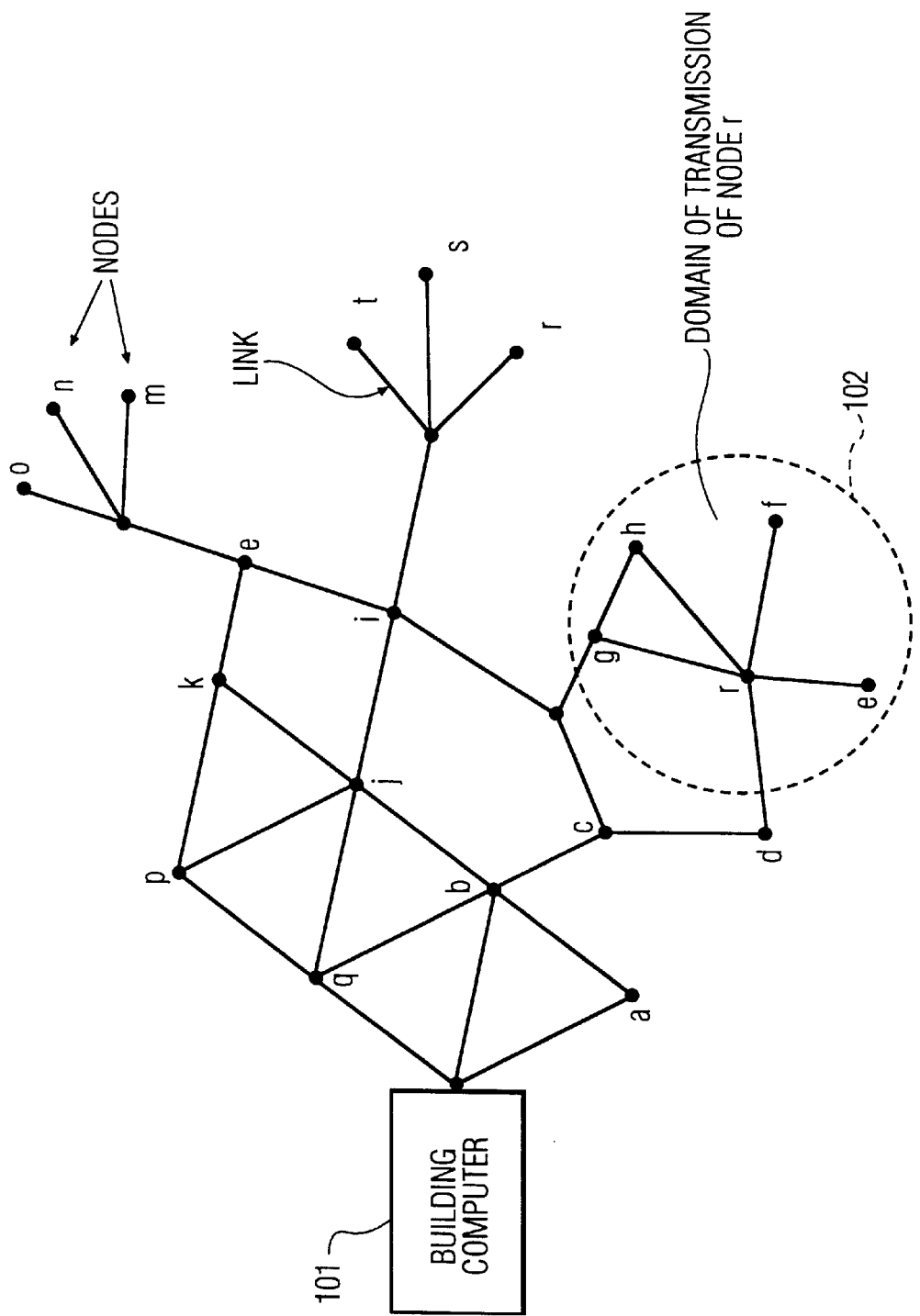
FIG. 1 shows a wireless multinode packet hopping network with a jammed area.

FIG. 1 shows a sample network of the type to which the invention is applied. This is a wireless lighting control network in a building. The central computer 101 issues commands to the nodes a–t. The central computer will generally be referred to herein as "building computer", because the preferred embodiment of the network is a building-wide lighting control network. However, if the network is not a building-wide network or if the network extends over more than one building, the name "central computer" could be more appropriate than "building computer". In any case, whether the device is a "central computer" or a "building computer" is immaterial to the invention, accordingly the terms should be regarded as interchangeable herein.

In the figure, the nodes are shown as interconnected, but the links are wireless. The building computer transmitter is not powerful enough to reach all nodes in the building. Accordingly, various intermediate nodes retransmit any messages from a building computer. Each node has a range of transmission 102, into which it can transmit.

Figure 2:
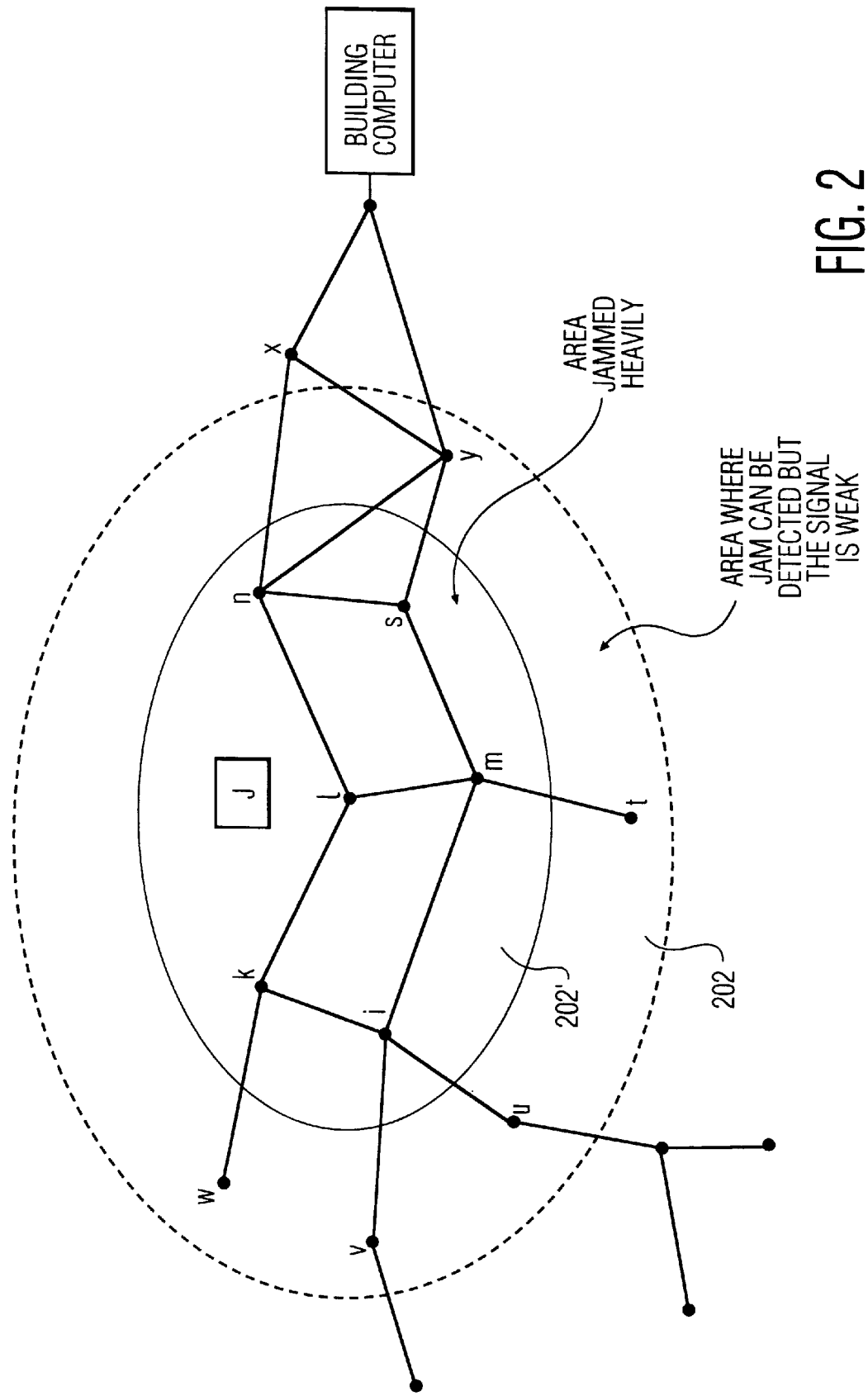
FIG. 2 shows a wireless multinode packet hopping network with a heavily jammed area and a more weakly jammed area.
Figures 3A, 3B, 3C:
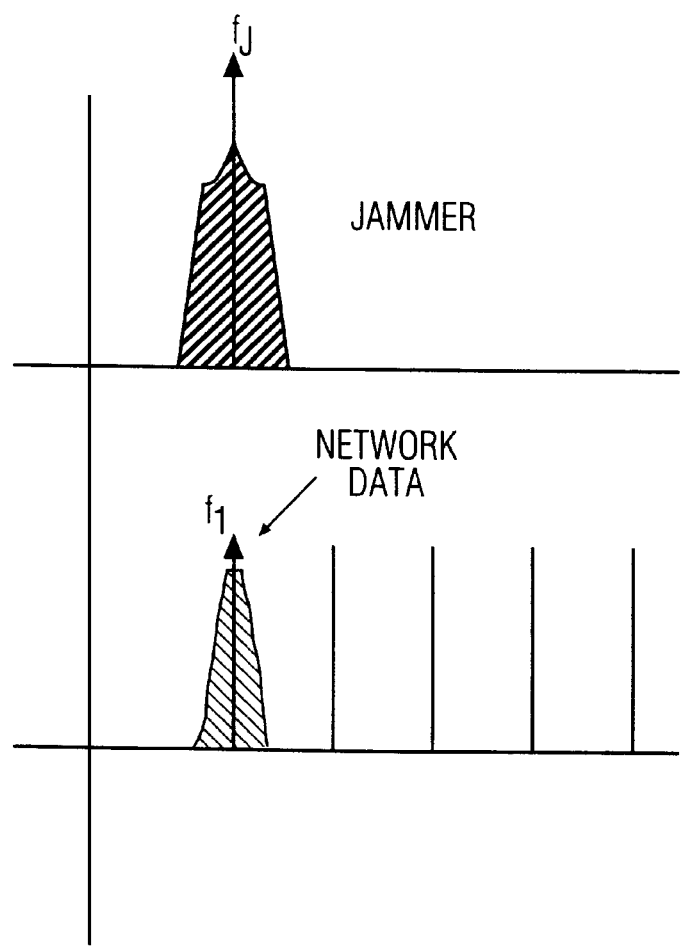
FIGS. 3a–c show frequencies of transmission and jamming.

FIG. 2 shows a network similar to that of FIG. 1 into which a jammer J is introduced. The jammer J jams an area 202' strongly and an outer area 202 weakly. Jammer J jams a frequency range around $f_j$ illustrated in FIG. 3a, while the network data appears at a frequency $f_1$. FIG. 3c shows the superposition of the network and jamming data. In FIGS. 3a–c the frequencies indicated by arrows are representative of the center of a narrow band (shaded) which can be used for transmission. For ease of description we talk of a single frequency, but actually it is a narrow band of frequencies around the center frequency.

FIGS. 4a–e are flowcharts outlining methods for dealing with the jamming. FIGS. 4a–c and 4e occur in the nodes and FIG. 4d occurs in the building computer. While the operation of the building computer and nodes are illustrated here in a software embodiment, the functions they perform can also be hardwired.

At the start 401, the node functions in idle state at frequency f1. Transmission is disabled and receive is enabled. Then the node checks whether the received signal strength indicator (RSSI) is high, for instance in the range of −75 dBm to the maximum value, at 406. If not, control returns to 401. If the outcome of the test at 406 is positive, control proceeds to 407 where the node tests whether the received signal is a valid packet.

If the signal is a valid packet, control passes to 405 where a response is generated. One possible response is to ignore the packet, in which case, control returns to 401. Otherwise, an acknowledge or repeat signal is enabled at 404, depending on whether the message was destined for the current node or whether it is to be retransmitted. At 403, the response is transmitted. At 402, the transmission is disabled and control returns to 401.

If the signal is not a valid packet, control passes to 408 where it is determined that a jam has been detected. The node then tests at 409 whether the duration of the jam exceeds a threshold, for instance five minutes. The threshold could be expressed in terms of a straight duration or in terms of some other statistical determination of excessive jamming. A statistical determination would require an evaluation of a statistical significance of a period of time jammed when compared with a predetermined interval of time. An example of a statistical determination would be a calculation of what percentage of the time interval is jammed. If a statistical calculation is to performed, the node must be configured or programmed to keep track of the time interval and perform the statistical calculation of how much the node is jammed. If the duration of the jam does not exceed the threshold, control returns to 401. If the jam does not exceed the threshold, then control passes to A, which connects to FIG. 4b.

At 413, the node checks whether the jammer has stopped transmission. If not, the node delays at 414, for instance for 100 µs. If the jammer has stopped, transmission is enabled at 415, and a jamming status report is transmitted at 416 on frequency $f_1$. The jamming status can indicate the duration and level of jamming. The jamming status report could also indicate what channels are free in the vicinity of the current node. Transmission is disabled at 417 and control returns to B on FIG. 4a.

After B, control returns to 411, where the node tests whether the jamming status report has been transmitted more than 7 times. If not, the node delays at 410 and returns to A. If the jamming status report has been sent more than 7 times, then control returns to 401. All seven times, the packet has the same I.D. to ensure that the receiving nodes treat them in the same fashion.

In the description of the various flowcharts herein, numerical examples are given for values, including of delays, thresholds, numbers of repetitions, lengths of time, and signal levels. All of the numerical values or ranges are suggestions only. The actual numbers or ranges are a matter of design choice. Those of ordinary skill in the art can set these values at any level which works out well in context.

Figure 4A:
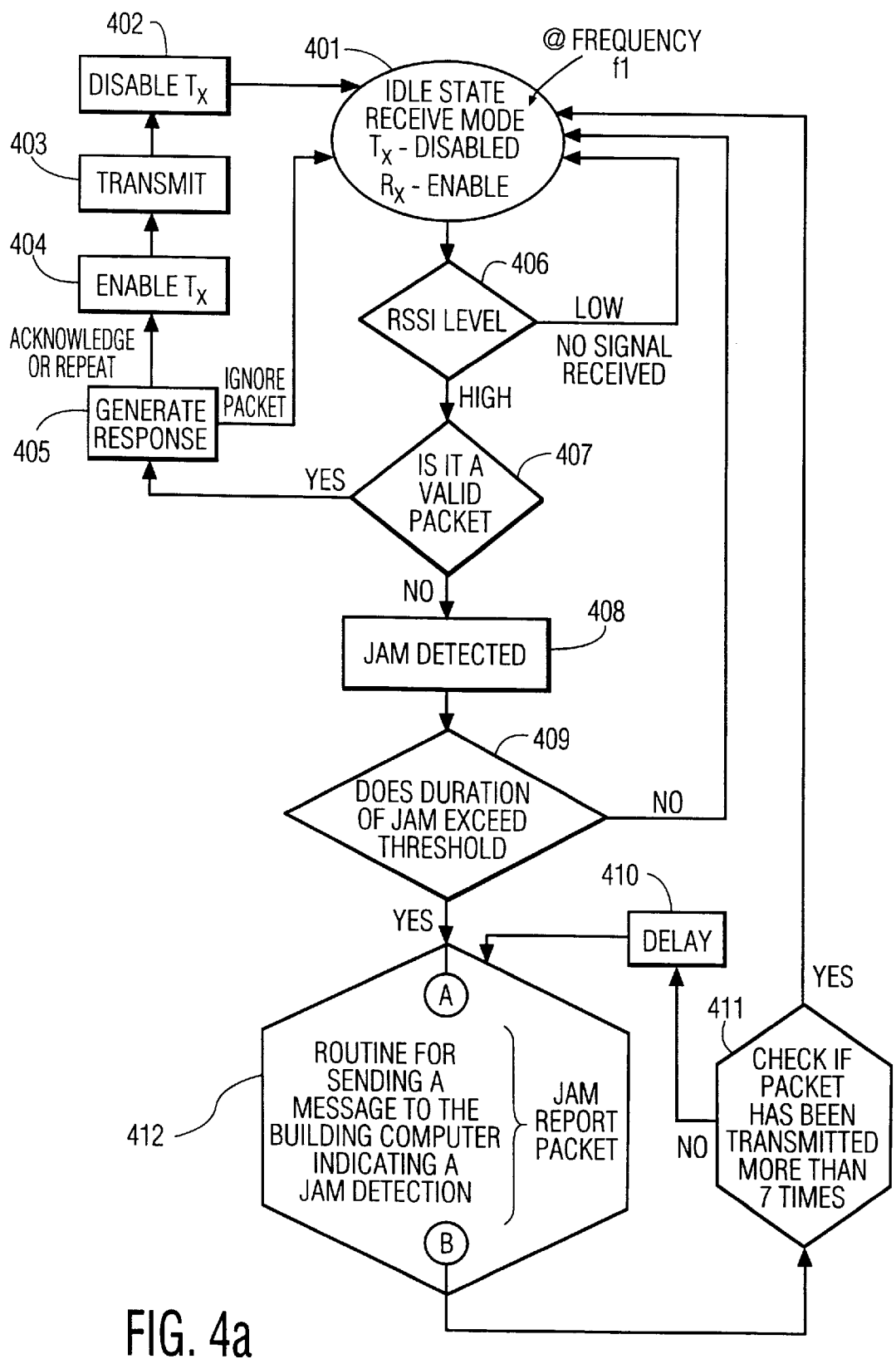
FIGS. 4a–e show flow charts of the operation of embodiments of the invention.
Figure 4B:
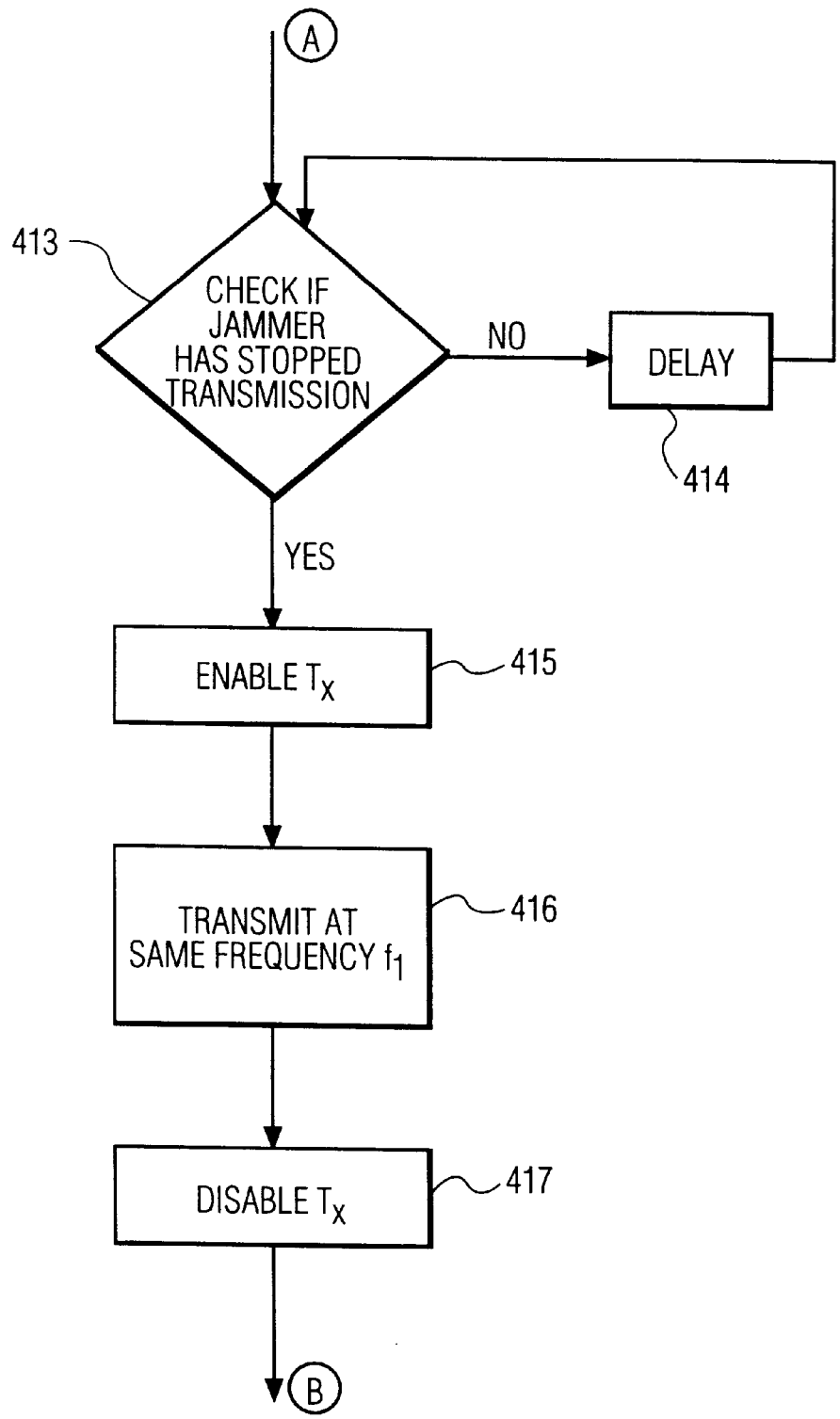
Figure 4C:
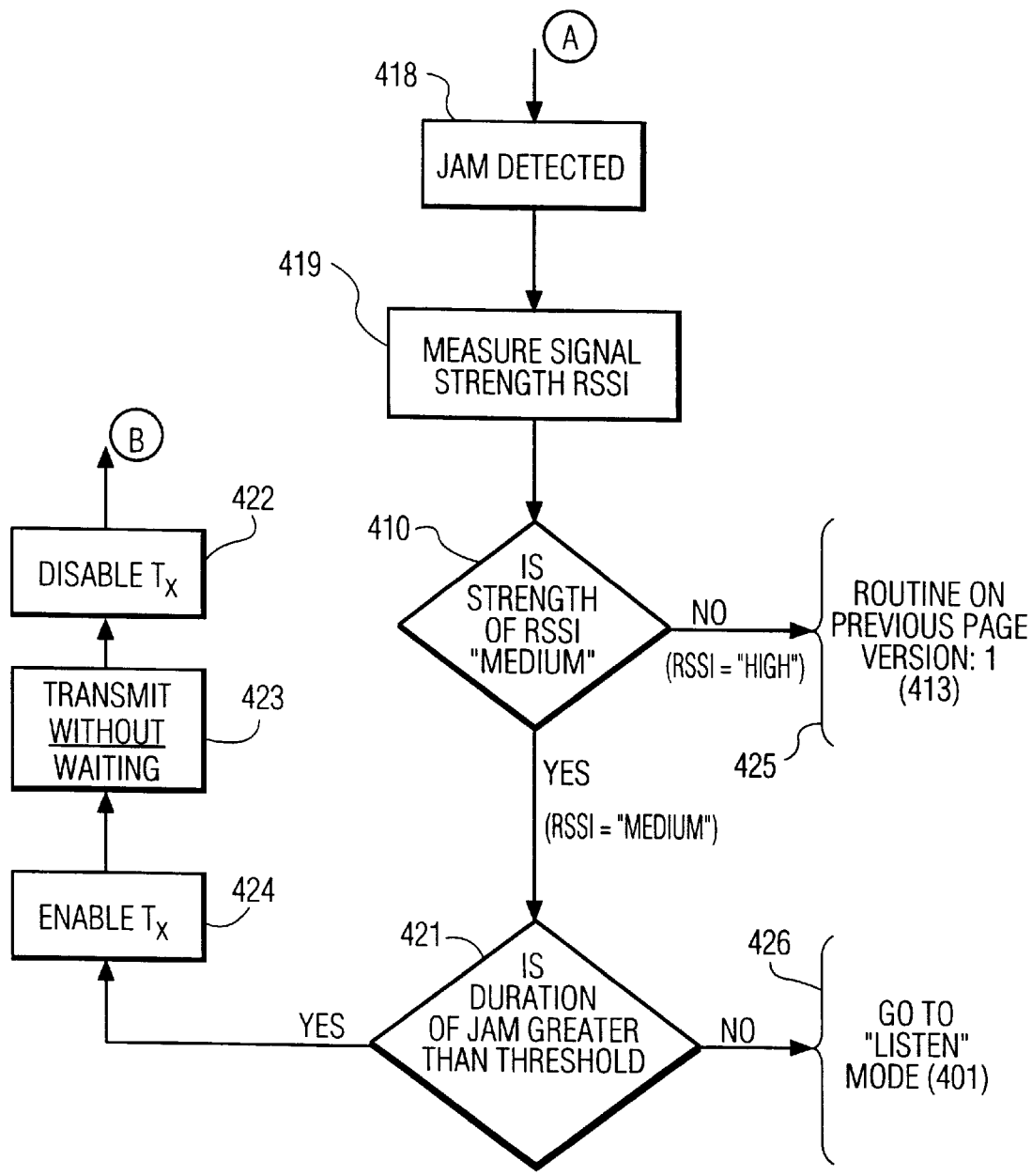

FIG. 4b shows an alternative embodiment to FIG. 4b, though it also incorporates 4c as a subroutine. In the embodiment of FIG. 4c, after A, a jam is detected at 418. Then the signal strength is measured at 419. At 420, the node tests whether the signal strength is medium. If no, i.e. if the signal strength is high, control passes to 413. What constitutes "low", "medium", and "high" here is a matter of design choice, but reasonable ranges could be as defined in the following table.

| | |
|---|---|
| high | −65 dBm to max |
| medium | −75 dBm to −65 dBm |
| low | below −75 dBm |

If yes, i.e. if the signal strength is medium, control passes to 421, where the node checks whether the duration of the jam is greater than some threshold. If the duration of the jam is greater than the threshold, then transmission is enabled at 424 and the jam status report is transmitted at 423 without waiting. In other words, at this point the node has determined that it is not in the region of strongest jamming and that there is a reasonable chance that the jamming status report is going to be received despite the jamming. Subsequently, transmission is disabled at 422 and control returns to B in FIG. 4a. If the medium strength jamming is not greater than the threshold, then, at 426, control returns to 401.

Figure 4D:
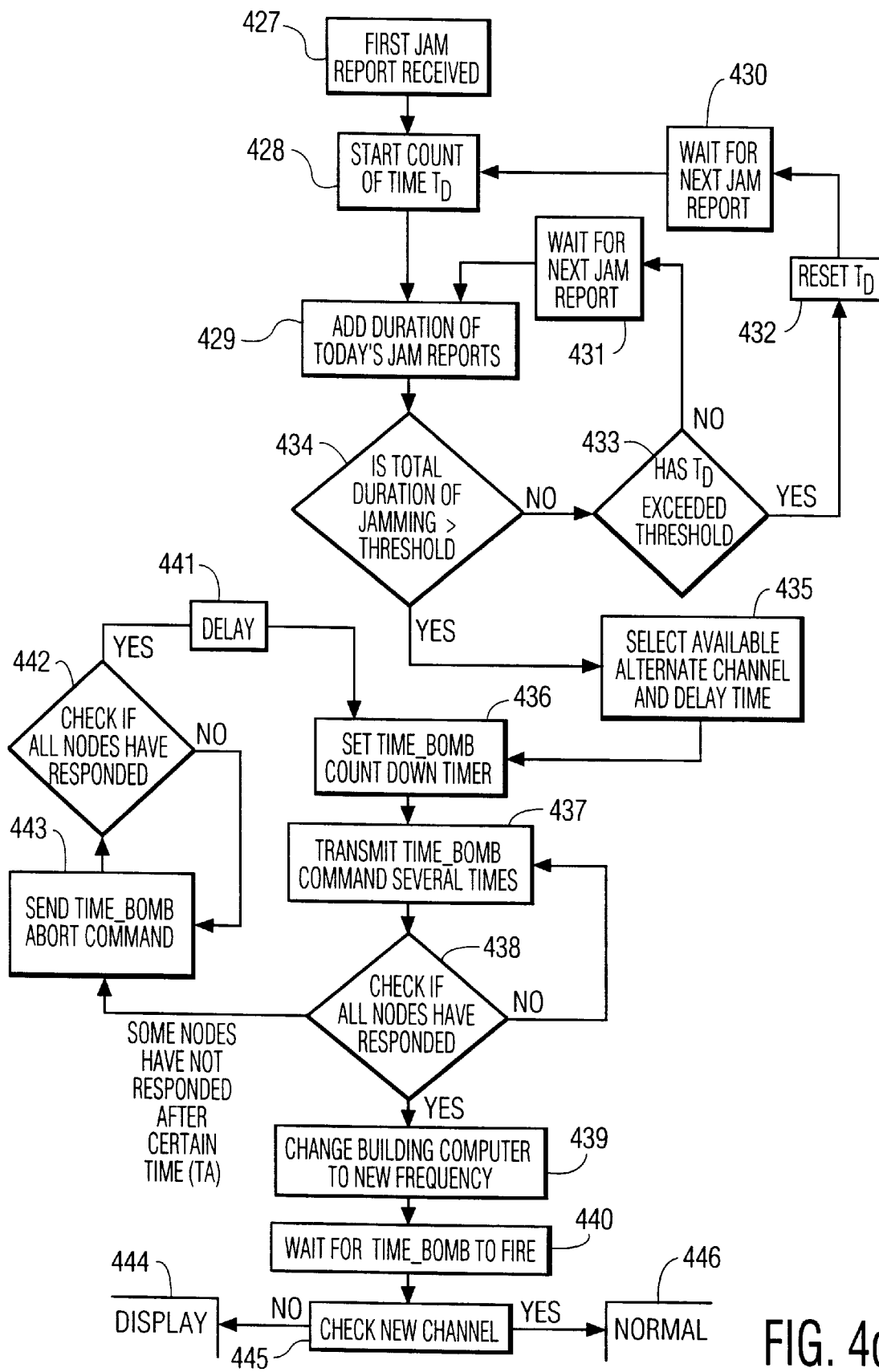

FIG. 4d illustrates the routine which is performed in the building computer ("BC") relating to jamming.

At 427, the first jamming status report is received. At 428, BC starts a count of time $T_D$. At 429, the total duration of previous jam reports, during the current $T_D$ period, is added together, i.e. the sum of non-overlapping durations from various jam reports. If the total duration of the jamming does not exceed a threshold, e.g. 1 hour, at 434, control passes to 433, where it is tested whether $T_D$ exceeds another threshold, e.g. 1 day. If 433 results in a negative determination, BC waits for the next jam report at 431 and control returns to 429 when that report is received. If 433 results in a positive determination, then control passes to 435, where the next jam is also awaited, but control returns to 428 after 435 rather than to 429, because the length of time between jam reports is sufficiently long that there is no cause for concern. In this way, the system tests whether the total duration of jamming over the course of a day is at least one hour.

Upon a positive determination at 434, control passes to 435, where BC selects an available alternate channel and fuse time, e.g. 5 minutes×the number of nodes. Based on the fuse time, BC sets a time-bomb count down timer at 436. At 437, BC transmits the time-bomb command several, e.g. 7, times. The time-bomb command will state the time at which the nodes are to change channels and the frequency to which they are to change. A proposed message format could be

| node address | packet I.D. | command ("time bomb") | new frequency | fuse time | check-sum |
|---|---|---|---|---|---|

At 438, BC checks to see if all nodes have responded. If some nodes have not responded after a time $T_A$, e.g. one quarter of the fuse time, a time bomb abort command is transmitted at 443. At 442, if all nodes have not responded at 442, the time bomb abort command is retransmitted. The abort command could have the following format

| node address | packet I.D. | command ("abort time bomb) | check-sum |
|---|---|---|---|

At 441, BC delays and control returns to element 436.

If not all nodes have responded but $T_A$ has not expired, then control returns to 437, where the time bomb is retransmitted several times.

If all nodes have responded to the time bomb, then BC changes to the new frequency at 439 and waits for the time bomb to fire at 440. At 455, the new communication channel is checked to see if it is functioning adequately. If not, an error message is displayed at 444. The user can then be asked to choose options, such as starting channel switching again or choosing a channel. If the new channel is functioning properly, then normal operation is resumed at 446.

Figure 4E:
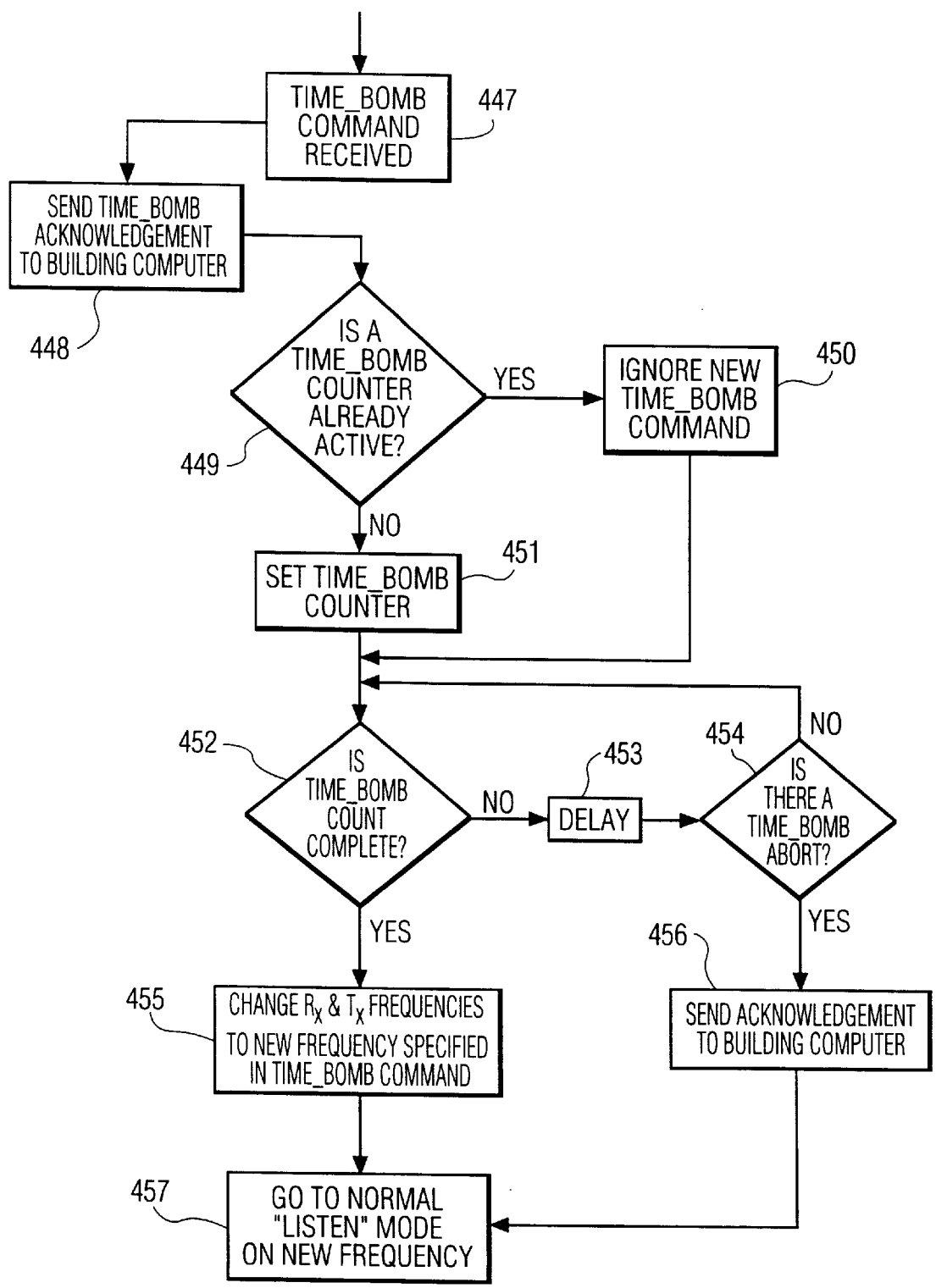

FIG. 4e is a flow chart for the processing of the time bomb command in the node. At 447 the time bomb command is received. At 448, the node acknowledges the time bomb command. At 449, the node tests whether a time bomb counter is already active. If so, the new time bomb command is ignored at 450. If not, the time bomb counter is set at 451. In this way, two time bombs are prevented from occurring at the same time.

At 452, the node tests whether the time bomb count is complete. If not the node delays at 453, e.g. for 100 μs, and then tests at 454 whether there is a time bomb abort. If there is no abort, control passes to 452. If there is an abort, the node sends an acknowledge to BC and control passes to 457. If the time bomb count is complete at 452, then control passes to 455, where the receive and transmit frequencies are set to the new value specified in the time bomb command and control passes to 457. At 457, the node returns to normal listen mode on the new frequency.

Ordinarily it would be assumed that the building computer would be programmed in a high level language such as C or visual basis. The processors in the nodes would be small microprocessors such as the Motorola HC11, which are best programmed directly in assembly language.

While the systems herein have been described in terms of programmed processors executing software, the same functions can be performed in hardware, such as ASICs.

What is claimed is:

1. A node for use in a wireless multinode network, the node comprising:
   a wireless transceiver arranged to transmit signals to and receive signals from other nodes in the network, with all nodes transmitting and receiving on a same frequency at any given time; and
   a processor coupled to the transceiver which is arranged to:
   detect a jammed status of the node;
   provide a jammed status report to be transmitted to at least one other node or base station in the multinode network; and
   process a received broadcast command, received from another node or base station in the multinode network, responsive to the jammed status report, to change the same frequency to a new same frequency for all nodes, after a fixed period of time,
   wherein the jammed status may be low, medium, or high and wherein the processor causes the transceiver to transmit the jammed status report when the jammed status is medium or low but delays transmission of the jammed status report when the jammed status is high.

2. A node for use in a wireless multinode network, the node comprising:
   a wireless transceiver arranged to transmit signals to and receive signals from other nodes in the network, with all nodes transmitting and receiving on a same frequency at any given time; and
   a processor coupled to the transceiver which is arranged to:
   detect a jammed status of the node;
   provide a jammed status report to be transmitted to at least one other node or base station in the multinode network; and
   process a received broadcast command, received from another node or base station in the multinode network, responsive to the jammed status report, to change the same frequency to a new same frequency for all nodes, after a fixed period of time,
   wherein
   the jammed status report is provided only if the duration of the jamming exceeds a threshold;
   the threshold is calculated as a statistical significance of an amount of time jammed when compared with a predetermined time interval.

3. The node of claim 2 wherein the statistical significance is a percentage.

4. A network comprising a central computer and a plurality of nodes arranged to operate on a packet hopping basis, each of the central computer and the nodes being arranged to communicate wirelessly with one or more other of the central computer and the nodes, and the central computer and the nodes all being arranged to transmit and receive on a same single frequency as each other at any given time, wherein
   each node comprises a respective processor arranged to detect a jammed status of that node;
   provide a jammed status report to another node or to the central computer; and
   process a broadcast command, received from another node or from the centralcomputer, to change to a second frequency after a fixed period of time;
   the central computer is arranged to process the jammed status report and originate the broadcast command at least once in response to the jammed status report; and
   at least one of the nodes is arranged to create the jammed status report if a period of time jammed exceeds a threshold.

5. A network comprising a central computer and a plurality of nodes arranged to operate on a packet hopping basis, each of the central computer and the nodes being arranged to communicate wirelessly with one or more other of the central computer and the nodes, and the central computer and the nodes all being arranged to transmit and receive on a same single frequency as each other at any given time, wherein each node comprises a respective processor arranged to
        detect a jammed status of that node;
        provide a jammed status report to another node or to the central computer; and
        process a broadcast command, received from another node or from the central computer, to change to a second frequency after a fixed period of time;
    the central computer is arranged to process the jammed status report and originate the broadcast command at least once in response to the jammed status report; and
    at least one of the nodes is arranged to create the jammed status report after a statistical calculation indicating a significance of an amount of time jammed when compared with a predetermined time interval.

6. A network comprising a central computer and a plurality of nodes arranged to operate on a packet hopping basis, each of the central computer and the nodes being arranged to communicate wirelessly with one or more other of the central computer and the nodes, and the central computer and the nodes all being arranged to transmit and receive on a same single frequency as each other at any given time, wherein each node comprises a respective processor arranged to
        detect a jammed status of that node;
        provide a jammed status report to another node or to the central computer; and
        process a broadcast command, received from another node or from the central computer, to change to a second frequency after a fixed period of time;
    the central computer is arranged to process the jammed status report and originate the broadcast command at least once in response to the jammed status report; and
    the central computer is arranged to test, after originating the broadcast command, for acknowledge signals and to abort the broadcast command in the absence of the acknowledge signals.

7. A network comprising:

a) a central node comprising
    i) a transceiver arranged to transmit and receive at a present frequency and having a transmission range;
    ii) a processor arranged to perform the following operations:
        A) detect a jammed status report from another node;
        B) provide an order for transmission to other nodes to change the present frequency to a new frequency after a fixed period of time;

b) a plurality of additional respective nodes, each respective node comprising
    i) a respective transceiver having the transmission range, each respective transceiver arranged to transmit and receive at the present frequency;
    ii) a respective processor for
        A) detecting a jammed status of the respective node;
        B) providing the jammed status report to be transmitted to at least one other of the plurality of nodes or the central node; and
        C) responding to the order, received via the transceiver, by causing retransmission of the order to at least one node and by causing the respective transceiver to transmit and receive at the new frequency;

the plurality of additional nodes comprising at least first and second sets of such nodes, the first set being within the transmission range of the central node, and the second set being outside the transmission range of the central node and reachable from the central computer by packet hopping from the first set, a duration of the fixed period of time being sufficient to exceed an expected packet hopping time from the central node to all nodes within the network.

8. The network of claim 7, wherein the jammed status is a jammed status of the respective node.

9. The network of claim 7, wherein each of the additional respective nodes further comprises means for executing some functionality other than data reception and transmission.

10. The network of claim 9, wherein the functionality is lighting control.

11. A network comprising a central computer and a plurality of nodes arranged to operate on a packet hopping basis, each of the central computer and the nodes being arranged to communicate wirelessly with one or more other of the central computer and the nodes, and the central computer and the nodes all being arranged to transmit and receive on a same single frequency as each other at any given time, wherein each node comprises a respective processor aged to
        detect a jammed status of that node;
        provide a jammed status report to another node or to the central computer; and
        process a broadcast command received from another node or from the central computer, to change to a second frequency after a fixed period of time;
    the central computer is arranged to process the jammed status report and originate the broadcast command at least once in response to the jammed status report; and
    the central computer is further arranged to perform the following operations:
        originating the broadcast command at least one second time;
        checking for responses from all nodes in the network; and
        if all nodes have not responded, aborting the broadcast command.

12. The network of claim 11, wherein the central computer is further arranged to perform the following operation: after aborting the broadcast command, issuing a new broadcast command.

\* \* \* \* \*